(12) United States Patent
Li et al.

(10) Patent No.: US 7,061,994 B2
(45) Date of Patent: Jun. 13, 2006

(54) METHODS AND APPARATUS FOR I/Q IMBALANCE COMPENSATION

(75) Inventors: Junyi Li, Bedminster, NJ (US); Vladimir Parizhsky, New York, NY (US)

(73) Assignee: Flarion Technologies, Inc., Bedminster, NJ (US)

(*) Notice: Subject to any disclaimer, the term of this patent is extended or adjusted under 35 U.S.C. 154(b) by 690 days.

(21) Appl. No.: 10/176,910

(22) Filed: Jun. 21, 2002

(65) Prior Publication Data

US 2003/0007574 A1  Jan. 9, 2003

Related U.S. Application Data

(60) Provisional application No. 60/299,859, filed on Jun. 21, 2001.

(51) Int. Cl.
H04L 27/06 (2006.01)

(52) U.S. Cl. ............................ 375/316; 375/329
(58) Field of Classification Search ................ 375/261, 375/268, 320, 269, 279, 316, 329, 322
See application file for complete search history.

(56) References Cited

U.S. PATENT DOCUMENTS

| 3,950,750 | A | * | 4/1976 | Churchill et al. ............ 342/174 |
| 4,475,088 | A |   | 10/1984 | Beard |
| 4,584,710 | A | * | 4/1986 | Hansen ..................... 455/226.1 |
| 4,622,694 | A |   | 11/1986 | Weber et al. |
| 4,696,017 | A | * | 9/1987 | Masheff et al. ............. 375/296 |
| 4,771,464 | A |   | 9/1988 | Kadin et al. |
| 4,882,614 | A |   | 11/1989 | Kageyama et al. |
| 4,947,454 | A |   | 8/1990 | Garner |
| 5,105,195 | A |   | 4/1992 | Conrad |
| 5,150,128 | A | * | 9/1992 | Kongelbeck ................ 342/174 |
| 5,259,000 | A |   | 11/1993 | Kojima et al. |
| 5,369,411 | A |   | 11/1994 | Lisle, Jr. |
| 5,444,863 | A |   | 8/1995 | Torii |
| 5,524,124 | A |   | 6/1996 | Koenig |
| 5,621,455 | A |   | 4/1997 | Rogers et al. |
| 5,633,891 | A |   | 5/1997 | Rebec et al. |
| 5,692,013 | A |   | 11/1997 | Koslov et al. |
| 5,694,419 | A |   | 12/1997 | Lawrence et al. |
| 5,705,949 | A | * | 1/1998 | Alelyunas et al. .......... 329/304 |
| 5,754,591 | A |   | 5/1998 | Samueli et al. |
| 5,848,099 | A |   | 12/1998 | Benner |
| 5,872,538 | A | * | 2/1999 | Fowler ...................... 342/194 |
| 5,949,821 | A | * | 9/1999 | Emami et al. .............. 375/235 |
| 6,009,317 | A | * | 12/1999 | Wynn ........................ 455/296 |
| 6,044,112 | A | * | 3/2000 | Koslov ....................... 375/235 |
| 6,118,322 | A | * | 9/2000 | Bockelman et al. ........ 327/317 |

(Continued)

Primary Examiner—Tesfaldet Bocure
Assistant Examiner—Naheed Ejaz
(74) Attorney, Agent, or Firm—Straub and Pokotylo; Michael P. Straub

(57) ABSTRACT

Methods and apparatus for performing amplitude and phase imbalance correction operations on in-phase and quadrature phase signal components corresponding to a received signal are described. The imbalance correction operations relay on the use of relatively simple to implement feedback loops. The phase imbalance feedback loop relies on the tendency of transmitted symbols to be distributed uniformly around the origin of the I/Q plane if proper phase balance is present in the processed signal. Phase correction coefficients are generated over time as a function of the negated product of the processed in-phase and quadrature phase signal components. Amplitude correction coefficients are generated over time as a function of the difference in the squared values of the I and Q processed signal components.

17 Claims, 5 Drawing Sheets

U.S. PATENT DOCUMENTS

| | | | |
|---|---|---|---|
| 6,342,821 B1 * | 1/2002 | Kim | 332/104 |
| 6,490,326 B1 * | 12/2002 | Bastani et al. | 375/317 |
| 6,925,132 B1 * | 8/2005 | Song et al. | 375/316 |
| 6,940,930 B1 * | 9/2005 | Brown et al. | 375/343 |
| 2002/0110201 A1 * | 8/2002 | Ozluturk et al. | 375/332 |
| 2003/0027610 A1 * | 2/2003 | Loke | 455/575 |

* cited by examiner

I/Q Imbalance
Compensation
Circuit

METHODS AND APPARATUS FOR I/Q IMBALANCE COMPENSATION

RELATED APPLICATIONS

The present application claims the benefit of U.S. Provisional patent application Ser. No. 60/299,859 filed Jun. 21, 2001, titled "I/Q Imbalance Compensation" which is hereby expressly incorporated by reference.

FIELD OF THE INVENTION

The present invention relates to communications systems and, more particularly, to methods and apparatus for in-phase (I) and quadrature phase (Q) imbalance compensation in a communication network.

BACKGROUND

In many communication systems, data is often converted into a passband signal, e.g., centered around a carrier frequency, before transmission. One reason for converting the original signal into a passband signal is that the conversion allows multiple channels of data to be transferred over a single transmission medium, e.g., by using several different carrier signals. A common example of this is radio broadcasts.

Since the transmitted signal is a passband signal, the received signal is also passband. In many systems, the passband signal is first converted to its baseband, i.e., is centered around zero frequency as opposed to the carrier frequency, before further signal processing takes place. The generation of the baseband signal is in many cases done with analog devices before any analog-to-digital conversion takes place. The baseband signal normally comprises an in-phase (I) component and a quadrature (Q) component.

The baseband signal may be any one of several different signal formats which are possible. Many transmitted signals are used to transmit values known as symbols. Various symbol transmission systems are designed so that symbols will be distributed in an I/Q plane relatively symmetrically about the origin over a period of time.

The I and Q components of a baseband signal are often processed separately, e.g., in parallel. As part of the steps to obtaining a baseband signal, the passband signal is copied and multiplied by a cos $(2\pi f_c t)$ signal to generate the I component and the same passband signal is copied and multiplied by a sin $(2\pi f_c t)$ signal to generate the Q component. In principle, the in-phase cos $(2\pi f_c t)$ and quadrature sin $(2\pi f_c t)$ components should have exactly $\pi/2$ phase shift and the same amplitude. However, in reality it is very difficult and costly to achieve a highly accurate $\pi/2$ phase shift and equal amplitude using analog devices. Consequently, the resultant in-phase and quadrature components generally have imbalance in amplitude and/or phase, i.e., I/Q imbalance, which causes signal quality degradation in the subsequent receiver signal processing.

FIG. 1 illustrates an exemplary 16-QAM (quadrature amplitude modulation) constellation 10, which is an example of a modulation scheme used to transmit data. Each symbol in the constellation is denoted by an "x". In known 16-QAM the permissible nominal symbol values for both the x and y coordinates is ($\pm 1$, $\pm 3$) with the nominal squared magnitude being approximately 2, 10 and 18. The rings are included in FIG. 1 to show how the symbols are distributed symmetrically around the original of the I/Q plane. As a result of phase imbalance, received symbols might appear to be distributed along an oval centered at the origin as opposed to around a circular ring centered at the origin. Amplitude imbalance may case the radius of the rings on which the symbols are located to deviate from the ring's intended radius. Such errors can complicate the process of accurate symbol interpretation.

In-Phase and Quadrature phase (I/Q) signal imbalance is a well-known problem in the receiver design of many communication systems. Therefore, many I/Q imbalance compensation devices are known in the art. Unfortunately some of these devices can be very complex in their design. Complex designs are often harder to implement in hardware, take more physical space to implement and have higher processing overhead than simple designs. Many known I/Q imbalance compensation devices only work with a particular type of received signal. Such devices use the specific structure and/or the nature of the received signal to compensate for I/Q imbalance. Unfortunately, those types of compensation devices are often limited in utility to the received signal for which they were designed. Using such devices for other types of received signals may cause more I/Q imbalance rather than compensate for it.

Accordingly, there is a need for new and improved methods and apparatus that can be used to compensate for, reduce, and/or eliminate I/Q imbalance. In addition, the methods and apparatus should be relatively independent of the received signal's structure, thereby making the methods and apparatus applicable to a greater diversity of communication systems than some of the known designs.

SUMMARY OF INVENTION

The present invention is directed to methods and apparatus for performing I and Q signal imbalance detection and correction operations.

In some embodiments, the imbalance correction operation is limited to phase error correction. However, in other embodiments both phase and amplitude imbalance compensation operations are performed.

Phase and amplitude correction coefficients are generated using a relatively simple feedback mechanism. Thus, in accordance with the invention the in-phase and quadrature phase signals resulting from phase and amplitude imbalance correction processing are used to update the correction coefficients.

Phase imbalance correction coefficient generation is performed as a function of the product of the processed in-phase and quadrature phase signals. These signals may be viewed as separate components of a single complex signal. The phase imbalance correction coefficient generation technique of the invention relies on the symmetric nature of most transmitted symbol constellations. Over time, the phase imbalance correction coefficient will average to zero assuming that received symbols are distributed symmetrically around the I/Q origin over time. If phase imbalance exists, the phase imbalance coefficients will cause the processed signals to tend to values which will have the expected symmetry.

To obtain the desired symbol averaging effect in generation of the phase imbalance correction coefficient, in some embodiments the phase imbalance correction coefficient is generated in a manner that depends on the symbol values received in multiple symbol time periods. This averaging effect is achieved in one embodiment of the invention by low pass filtering the inverse of the product of the processed in-phase and quadrature phase signals.

The amplitude imbalance correction coefficient may be generated based on the difference between squared in-phase and quadrature phase values that is detected over some period of time, e.g., multiple symbol periods.

Phase and amplitude correction operations may be performed on input signals $I_1$, and $Q_1$ to generate processed signals $I_2$ and $Q_2$ as follows:

$$I_2 = I_1 + Kx \times Q_1; \text{ and}$$

$$Q_2 = xI_1 + KQ_1;$$

where x is the phase correction coefficient and K is the amplitude correction coefficient generated in accordance with the invention.

Numerous additional features, benefits and details of the methods and apparatus of the present invention are described in the detailed description which follows.

DETAILED DESCRIPTION OF INVENTION

As mentioned earlier, the present invention describes methods and apparatus for correcting for I and Q phase imbalance in a received signal. As will be discussed below, this is done by adaptively compensating for I/Q imbalance using simple feedback in accordance with the present invention.

Figure 1:
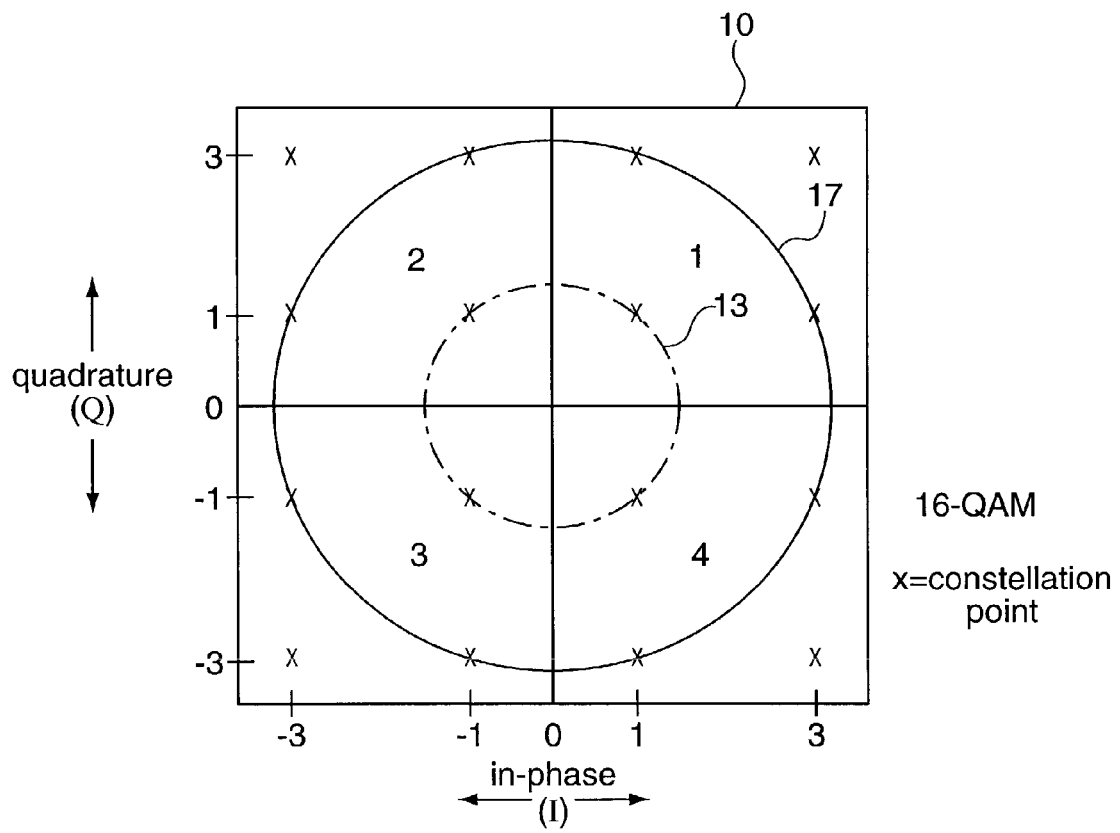
FIG. 1 illustrates a known 16-QAM symbol constellation.
Figure 2:
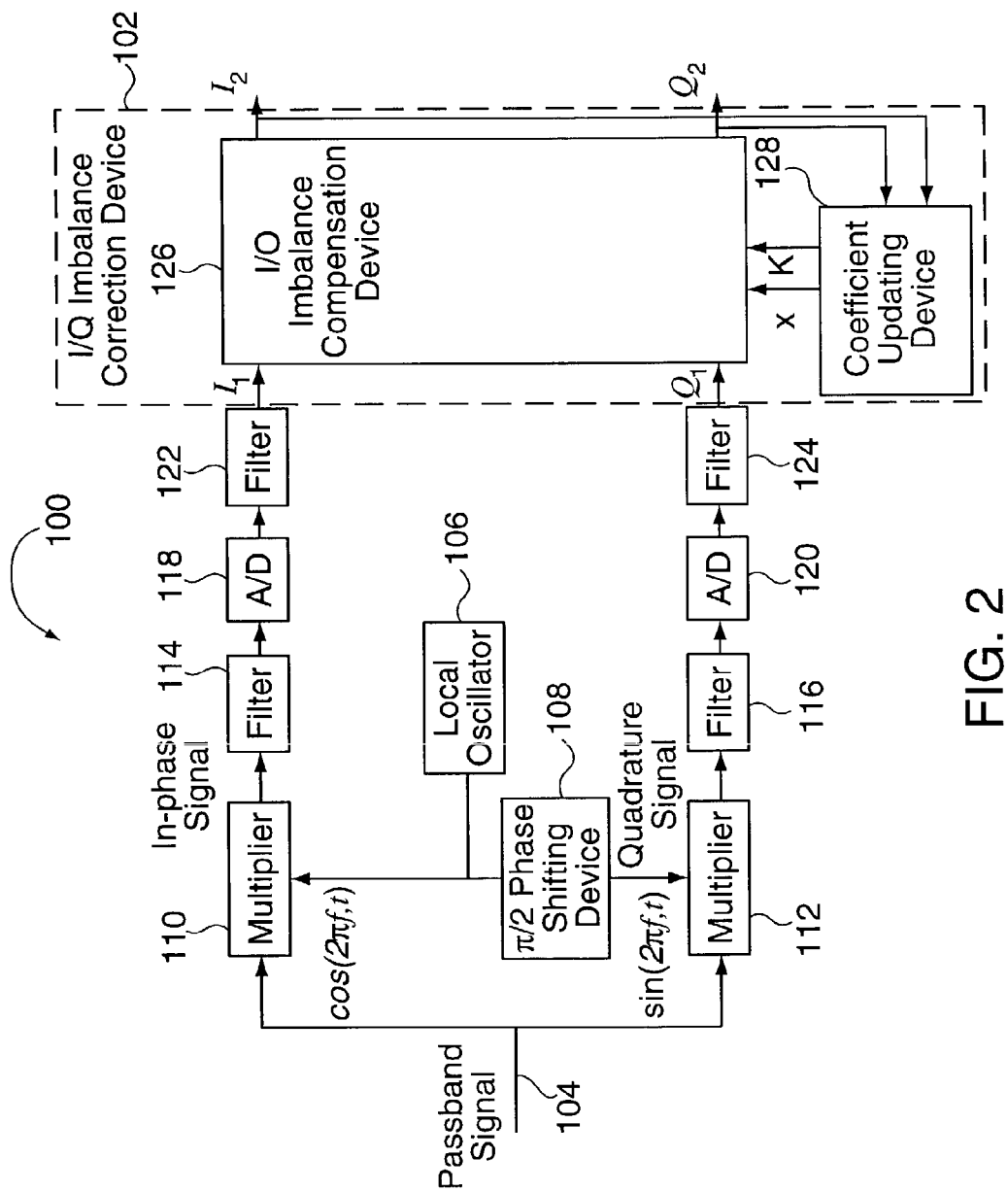
FIG. 2 illustrates a communication device implemented with an exemplary embodiment of an I/Q imbalance correction device of the present invention.

FIG. 2 illustrates an exemplary communication apparatus 100 implemented in accordance with one exemplary embodiment of the present invention. The apparatus may be, e.g., part of a receiver. The communication apparatus 100 includes an input line 104, local oscillator 106, π/2 phase shifting device 108, two multipliers 110, 112, two analog filters 114, 116, two analog to digital converters 118, 120, two digital filters 122, 124 and an I/Q imbalance correction module 102 coupled together as illustrated in FIG. 2.

An exemplary description of an I/Q imbalance compensation operation will now be described with reference to communication apparatus 100. The description will include a discussion of exemplary operations performed by the aforementioned components. The received signal, which serves as input to the apparatus 100, is generally a passband signal centered on a carrier frequency. The signal enters apparatus 100 through input 104. The input 104 is split into two paths, sending the received input signal to an in-phase path and to a quadrature path. The two paths are used to produce the in-phase and quadrature signal components as part of the process of converting the received passband signal into a baseband signal.

The local oscillator 106 drives the multiplier 110 included in the in-phase path with a generated signal of $\cos(2\pi f_c t)$. In addition, the local oscillator 106 also drives the multiplier 112 in the quadrature path after being shifted by π/2 by phase shifting device 108. Thus, phase shifting device 108 generates the signal $\sin(2\pi f_c t)$ used by multiplier 112. In the preceding locally generated signals, t is the time variable and $f_c$ is a down conversion frequency, e.g., the carrier frequency. Note that ideally generated $\cos(2\pi f_c t)$ and $\sin(2\pi f_c t)$ components have an exact π/2 phase shift. However, in various exemplary embodiments the phase shifting operation is implemented with analog devices which may not be as accurate as desired. This can lead to I/Q imbalance, i.e., mismatch between the phase of the in-phase and the quadrature signal components. Amplitude errors may also be introduced, e.g., due to slight differences between multipliers 110 and 112. Unless corrected, I/Q imbalance tends to corrupt the baseband signal and degrade the receiver performance.

In the in-phase path, multiplier 110 multiples the local oscillator signal, i.e., $\cos(2\pi f_c t)$, with the received signal. The resulting in-phase (I) signal is filtered by analog filter 114, and then converted from analog to digital by A/D converter 118. The digital I signal is then filtered by digital filter 122 and then supplied to the input of the I/Q imbalance correction module 102 of the present invention.

The quadrature signal path, which includes multiplier 112, filter 116, A/D converter 120, and digital filter 124 are coupled in the same manner as the in-phase path. The filtered Q signal output by digital filter 124 is supplied to the second input of I/Q imbalance correction module 102. The I/Q imbalance correction module 102 simultaneously compensates for amplitude and phase imbalance between the I and Q input signals and outputs a corrected in-phase (I) signal and a corrected quadrature (Q) signal. The outputs of the correction module 102 are the balanced in-phase and quadrature baseband signals. The balanced I and Q baseband signals are supplied to other communication device components (not shown) for further signal processing, e.g., signal decoding. The I/Q imbalance correction module 102 is suitable for use in a plurality of different receiver designs that suffer from I/Q imbalance and is not overly dependant on signal characteristics.

The I/Q imbalance correction module 102 includes an I/Q imbalance compensation module 126, and a coefficient updating module 128. The I/Q imbalance compensation module 126 corrects the I/Q imbalance between its two input signals as a function of a phase compensation correction coefficient, x and an amplitude correction coefficient K. As will be discussed below, x coefficient is used for phase compensation, and the K coefficient is used for amplitude compensation. One constraint of the compensation coefficients is that the value of the amplitude correction coefficent should be non-negative. The I/Q imbalance compensation module 126 adjusts to changes in I/Q imbalance through the use of coefficient updating module 128, which is responsible for generating the correction coefficients.

Figure 3:
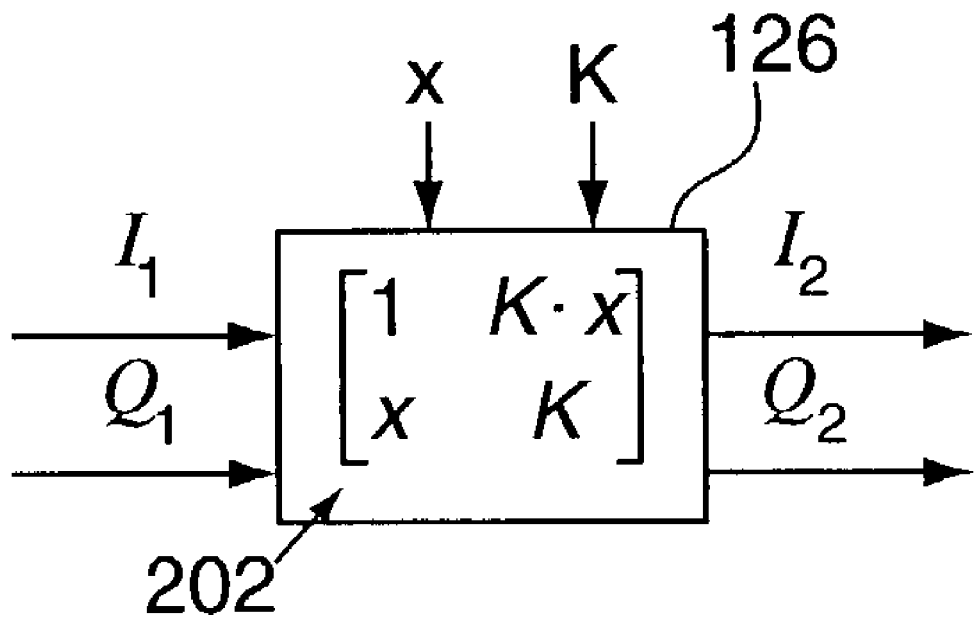
FIG. 3 illustrates a detailed view of the I/Q imbalance compensation device of FIG. 2

FIG. 3 illustrates a detailed view of an exemplary I/Q imbalance compensation module 126. In-phase and quadrature signal components, $I_1$ and $Q_1$, respectively, are inputs to the compensation module 126, as well as coefficients K and x. In accordance with the invention, and as shown in FIG. 3, the outputs of the compensation module 126, $I_2$ and $Q_2$, are given by $$\begin{bmatrix} I_2 \\ Q_2 \end{bmatrix} = \begin{bmatrix} 1 & Kx \\ x & K \end{bmatrix} \cdot \begin{bmatrix} I_1 \\ Q_1 \end{bmatrix}$$

Thus, $$I_2 = I_1 + K \times Q_1; \text{ and}$$

$$Q_2 = xI_1 + KQ_1$$

Initial values may be set as follows:
$I_2 = I_1$
$Q_2 = Q_1$
$K = 1$
$x = 0$.

Initial amplitude correction factor K=1 corresponds to the case where no correction, e.g., alteration, of the I and Q signal's amplitude is to occur. Similarly, x=0 corresponds to the case where no phase correction is to be applied to the I and Q signals. Over time, the initial values for K and x are adjusted based on the detected phase and amplitude errors.

In accordance with the present invention, phase correction may be used independent of amplitude correction, in such a case, amplitude correction factor K is treated as 1 resulting in the following:

$$I_2 = I_1 + xQ_1$$

$$Q_2 = xI_1 + Q_1$$

where x is the phase correction coefficient.

As mentioned earlier, K and x represent the compensation coefficients for amplitude and phase imbalance, respectively.

Figure 4:
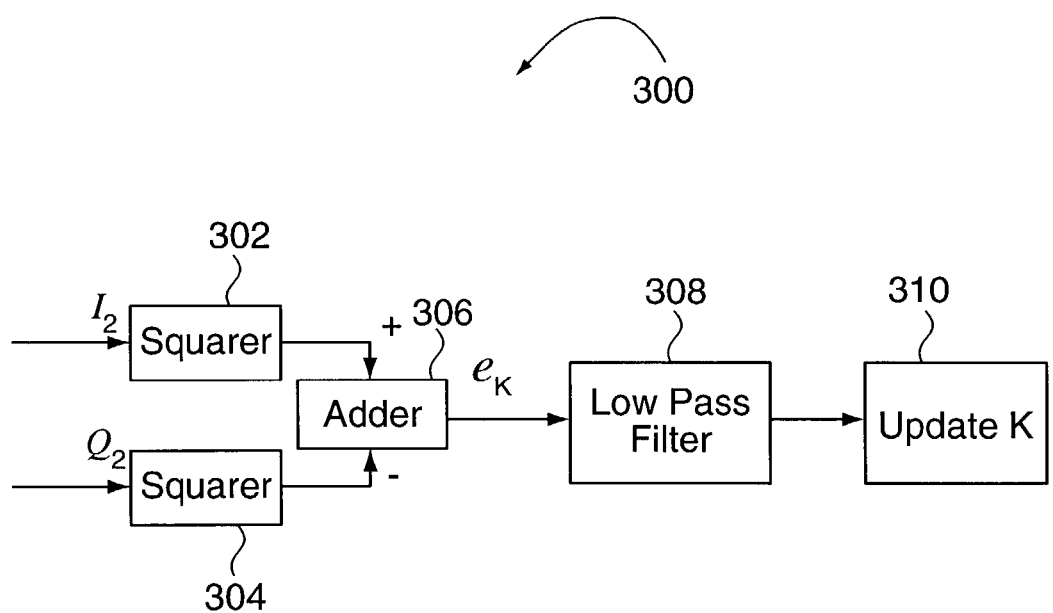
FIG. 4 illustrates an exemplary implementation of a coefficient K updating component of the coefficient updating device of FIG. 2, in accordance with the invention.
Figure 5:
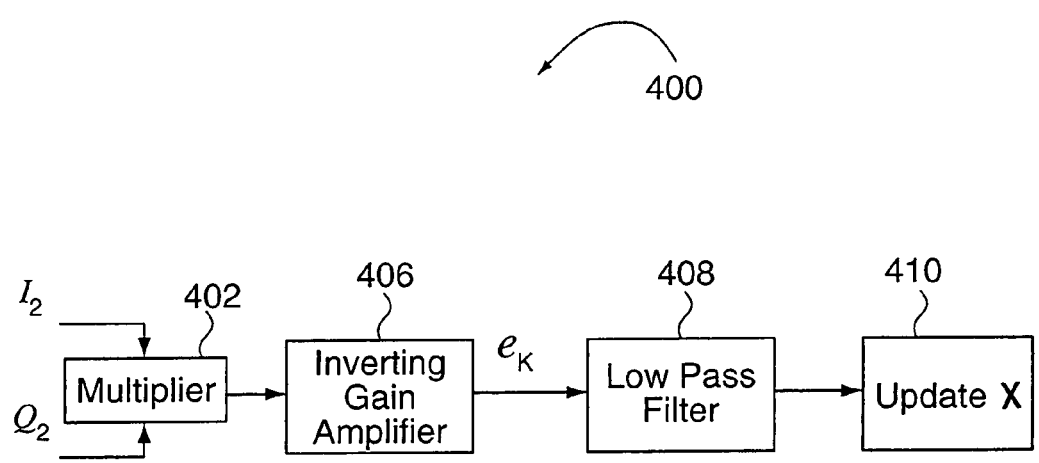
FIG. 5 illustrates an exemplary implementation of a coefficient x updating component of the coefficient updating device of FIG. 2, in accordance with the invention.

The amplitude and phase correction coefficients K and x in the compensation module 126 are updated periodically by coefficient updating module 128, in a feedback manner, as a function of the corrected I and Q signals $I_2$ and $Q_2$. Coefficient updating circuit 128 is part of a feedback loop that uses the current I and Q corrected signals to determine the current received signal imbalance. Updating of the values K and x can, and in the illustrated embodiment is, done separately, e.g., using separate circuits to generate the K and x coefficient values from the $I_2$ and $Q_2$ signals. FIGS. 4 and 5 illustrate exemplary embodiments of circuits which can be used to implement the coefficient updating module 128.

FIG. 4 illustrates an exemplary coefficient K updating circuit 300 implemented in accordance with the invention. The coefficient K updating circuit 300 includes two squarers 302, 304, an adder 306, a low pass filter 308, and memory 310 to store the value of K. In accordance with the invention and as shown in FIG. 4, an error term, $e_K$, used to adjust the value of the K amplitude correction coefficient, is calculated as follows:

$$e_K = (I_2)^2 - (Q_2)^2$$

The inputs, $I_2$ and $Q_2$, are independently squared by squarers 302, 304 and the squared quadrature component is subtracted from the squared in-phase component. Next, the obtained error term, $e_K$, is passed through a low pass filter 308 to update K. For example, in a discrete first-order low pass filter implementation, $$K_{new} = K_{old} + \alpha_K \cdot e_K,$$

where $K_{new}$ and $K_{old}$ are values after and before updating respectively, and $\alpha_K$ is a filter coefficient that acts as a step size used to control the rate at which the value K is adjusted. In one exemplary embodiment, $\alpha_K$ is set to equal a value in the range of $0 < \alpha \leq 1$. By selecting $\alpha$ to be small, e.g., $\alpha \leq 0.25$, transient noise or other short term signal changes will not significantly effect the imbalance compensation operation since the transient noise's brief signal effect will be moderated by the low pass filtering effect achieved through the use a small $\alpha$.

The updated amplitude correction value of K is stored in memory unit 310 and updated in the I/Q imbalance correction module 126 at the next periodic update, e.g., on the next clock cycle.

FIG. 5 illustrates an exemplary phase correction coefficient (x) updating circuit 400 implemented in accordance with the invention. The coefficient x updating circuit 400 includes a multiplier 402, an inverting gain amplifier 406, a low pass filter 408, and memory 410 to store the value of x, which are coupled together as shown in FIG. 5. In accordance with the invention, an error term, $e_x$, used to adjust the value of the x coefficient, is calculated by $$e_x = -(I_2)(Q_2)$$

Thus, the present invention performs phase corrections as a function of the negative of the product of the $I_2$ and $Q_2$ signals being processed. For a phase balanced signal corresponding to a symbol set uniformly distributed in the I/Q plane around the I/Q origin, statistically $I_2Q_2$ will equal 0. In other words, whenever $I_2Q_2$ is not equal to zero, the feedback compensation loop will try to adjust X in a direction that tends to force $I_2Q_2$ to zero. In this manner, over time, phase compensation is performed.

To generate the value $e_x$, the inputs, $I_2$ and $Q_2$, are multiplied by multiplier 402 and the calculated value is negated by inverting gain amplifier 406. Next, the obtained value, $e_x$, is passed through a low pass filter 408 to update x. For example, in a discrete first-order low pass filter implementation, $$x_{new} = x_{old} + \alpha_x \cdot e_x,$$

where $x_{new}$ and $x_{old}$ are values after and before updating respectively, and $\alpha_x$ is a filter coefficient. As noted above, $x_{old}$ may be initialized to 0. $\alpha_x$ may be the same as $\alpha_k$ and is used, in various embodiments, to achieve low pass filtering in the same manner as $\alpha_k$ was used in regard to the amplitude correction coefficient generation. Thus, $\alpha_k$ will normally be selected to be a value in the range of $0 < \alpha \leq 1$. While in some embodiments where low pass filtering is implemented, $\alpha_x \leq 0.25$. The updated value of x is stored in memory unit 410 and updated in the I/Q imbalance correction module 126 on the next periodic update, e.g., at the next clock cycle.

The steps of the various methods of the invention discussed above may be implemented in a variety of ways, e.g., using software, hardware or a combination of software and hardware to perform each individual step or combination of steps discussed. Various embodiments of the present invention include means for performing the steps of the various methods. Each means may be implemented using software, hardware, e.g., circuits, or a combination of software and hardware. When software is used, the means for performing a step may also include circuitry such as a processor for executing the software. Accordingly, the present invention is directed to, among other things, computer executable instructions such as software for controlling a machine or circuit to perform one or more of the steps or signal processing operations discussed above.

The invention claimed is:

1. A system for performing in-phase and quadrature phase signal imbalance compensation on an input in-phase signal $I_1$ and an input quadrature phase signal $Q_1$ to produce a processed in-phase signal $I_2$ and a processed quadrature phase signal $Q_2$, the system comprising:
   a phase imbalance correction coefficient generation circuit for generating a phase imbalance correction coefficient x from a plurality of previously processed in-phase and quadrature phase signals, said previously processed in-phase and quadrature phase signals corresponding to transmitted symbol values from a symbol constellation including a plurality of different symbol values distributed around an I/Q origin, said transmitted symbol values being distributed symmetrically around said I/Q origin over time;

an amplitude imbalance correction coefficient generation circuit for generating an amplitude imbalance correction coefficient K from at least some of said plurality of previously processed in-phase and quadrature phase signals;

an imbalance compensation device having an input for receiving said received signals $I_1$ and $Q_1$ and an output for outputting said processed signals $I_2$ and $Q_2$ said output being coupled to an input of said phase imbalance correction coefficient generation circuit and said amplitude imbalance correction coefficient circuit, said imbalance compensation device including:

a module for generating said processed signals $I_2$ and $Q_2$ from said received signals $I_1$ and $Q_1$ according to the following equation:

$$I_2 = I_1 + K x \times Q_1; \text{ and}$$

$$Q_2 = x I_1 + K Q_1.$$

2. The system of claim 1, wherein said phase imbalance correction coefficient generation circuit includes means for generating said phase imbalance correction coefficient according to the following equation:

$$x_{new} = x_{old} + \alpha_x \cdot e_x,$$

where $X_{new}$ is the generated phase imbalance correction coefficient, $X_{old}$ is a previously generated phase imbalance correction coefficient; and where:

$$e_x = -(I_2)(Q_2); \text{ and where } \alpha_x \text{ is a constant in the range } 0 < \alpha_x \leq 1.$$

3. The system of claim 2, wherein said amplitude imbalance correction coefficient generation circuit includes means for generating said amplitude imbalance correction coefficient K according to the following equation:

$$K_{new} = K_{old} + \alpha_K \cdot e_K,$$

where $K_{new}$ is the generated amplitude imbalance correction coefficient, $K_{old}$ is a previously generated amplitude imbalance correction coefficient; and where:

$$e_K = (I_2)^2 - (Q_2)^2; \text{ and}$$

where $\alpha_x$ is a constant in the range $0 < \alpha_x \leq 1$.

4. A system for performing in-phase and quadrature phase signal imbalance compensation on an input in-phase signal $I_1$ and an input quadrature phase signal $Q_1$ to produce a processed in-phase signal $I_2$ and a processed quadrature phase signal $Q_2$, the system comprising:

a phase imbalance correction coefficient generation circuit for generating a phase imbalance correction coefficient x from a plurality of previously processed in-phase and quadrature phase signals, said previously processed in-phase and quadrature phase signals corresponding to transmitted symbol values from a symbol constellation including a plurality of different symbol values distributed around an I/Q origin, said transmitted symbol values being distributed symmetrically around said I/Q origin over time;

an imbalance compensation device having an input for receiving said received signals $I_1$ and $Q_1$ and an output for outputting said processed signals $I_2$ and $Q_2$, said output being coupled to an input of said phase imbalance correction coefficient generation circuit, said imbalance compensation device including:

a module for generating said processed signals $I_2$ and $Q_2$ from said received signals $I_1$ and $Q_1$ according to the following equation:

$$I_2 = I_1 + x \times Q_1; \text{ and}$$

$$Q_2 = x I_1 + Q_1.$$

5. The system of claim 4, wherein said phase imbalance correction coefficient generation circuit includes means for generating said phase imbalance correction coefficient according to the following equation:

$$x_{new} = x_{old} + \alpha_x \cdot e_x,$$

where $X_{new}$ is the generated phase imbalance correction coefficient x, $X_{old}$ is a previously generated phase imbalance correction coefficient; and where:

$$e_x = -(I_2)(Q_2); \text{ and}$$

where $\alpha_x$ is a constant in the range $0 < \alpha_x \leq 1$.

6. A system for performing at least one in-phase and quadrature phase signal imbalance compensation operation on in-phase and quadrature phase signal components of a signal, the system comprising:

a phase imbalance correction coefficient generating circuit for generating a phase imbalance correction coefficient from a plurality of previously processed in-phase and quadrature phase signal components, said circuit including:

i. phase error estimation means for generating the inverted product of said in-phase and quadrature phase signal components, said in-phase and quadrature phase signal components corresponding to transmitted symbol values from a symbol constellation including a plurality of different symbol values distributed around an I/Q origin, said transmitted symbol values being distributed symmetrically around said I/Q origin over time;

ii. a low pass filter for performing a low pass filtering operation on the inverted product of said previously processed in-phase and previously processed quadrature phase signal components to produce a phase error correction coefficient signal, a plurality of said previously processed in-phase and previously processed quadrature phase signal components contributing over time to the generated phase error correction coefficient signal.

7. The system of claim 6, wherein said phase error estimation means includes:

a multiplier for multiplying the in-phase and quadrature phase signal components together; and an inverter for inverting the output of said multiplier.

8. The system of claim 6, further comprising:

an imbalance compensation device coupled to said phase imbalance correction coefficient generating circuit for processing said in-phase and quadrature phase signal components before they are supplied to said phase imbalance correction coefficient generating circuit to generate said previously processed in-phase and quadrature phase signal components, said phase imbalance compensation device including:

a module for performing a phase imbalance compensation operation on at least one of said in-phase and quadrature phase signal components as a function of the phase error correction coefficient signal generated by said phase imbalance correction coefficient generating circuit.

9. The system of claim 8, further comprising:
an amplitude imbalance correction coefficient generating circuit for generating at least one amplitude correction coefficient, said circuit including:
i. amplitude error estimation means for generating an error estimate as a function of the amplitude difference between said in-phase and said quadrature phase signal components; and
ii. a low pass filter for performing a low pass filtering operation on the amplitude error estimate generated by said amplitude error estimation means to produce said at least one amplitude correction coefficient.

10. The system of claim 9, wherein said imbalance compensation device is further coupled to said amplitude imbalance correction coefficient generating circuit.

11. The system of claim 10, wherein said imbalance compensation device outputs a processed in-phase signal component $I_2$ and a processed quadrature phase signal component $Q_2$ and receives as its input an unprocessed in-phase signal component $I_1$ and an unprocessed in-phase signal component $Q_1$, and said imbalance compensation device includes means for generating the processed in-phase signal component $I_2$ and processed quadrature phase signal component $Q_2$ as follows:

$I_2 = I_1 + Kx \times Q_1$; and $Q_2 = xI_1 + KQ_1$ where:

x is the phase imbalance correction coefficient and
K is the amplitude imbalance correction coefficient.

12. A method of processing in-phase and quadrature phase signal components, comprising:
generating a phase error correction factor as a function of a plurality of previously processed in-phase and quadrature phase signal components, said previously processed in-phase and quadrature phase signal components corresponding to transmitted symbol values from a symbol constellation including a plurality of different symbol values distributed around an I/Q origin, said transmitted symbol values being distributed symmetrically around said I/Q origin over time; and
performing a phase imbalance correction operation on a pair of in-phase and quadrature phase signal components corresponding to a point in time, by:
multiplying a second one of said pair of in-phase and quadrature phase signal components by said correction factor; and
adding a first one of said pair of in-phase and quadrature phase signal components to the result of multiplying the second one of said pair of in-phase and quadrature phase signal components by said correction factor to produce an updated signal corresponding to said first one of said pair of subsequent in-phase and quadrature phase signal components.

13. The method of claim 12, wherein said step of performing a phase imbalance correction operation on said pair of in-phase and quadrature phase signal components corresponding to a subsequent point in time further comprises:
multiplying the first one of said pair of in-phase and quadrature phase signal components by said correction factor; and
adding the second one of said pair of in-phase and quadrature phase signal components to the result of multiplying the first one of the said pair of in-phase and quadrature phase signal components by said correction factor to produce an updated signal corresponding to said second one of said pair of in-phase and quadrature phase signal components.

14. The method of claim 13, wherein the first one of said pair of in-phase and quadrature phase signal components is the in-phase signal component in said pair and wherein the second one of said pair of in-phase and quadrature phase signal components is the quadrature phase signal component in said pair.

15. The method of claim 14, wherein generating said phase error correction signal includes:
negating a product of a received in-phase signal component and a received quadrature phase signal component;
multiplying the negated product of said received in-phase and said received quadrature phase signal components by a value less than one to generate a phase error correction update; and
adding said phase error correction update to a previous phase error correction signal.

16. The method of claim 15, wherein said value less than one is a value less than or equal to 0.25.

17. The method of claim 15, generating an amplitude error correction signal, said step of generating an amplitude error correction signal including:
squaring the received in-phase signal component and the received quadrature phase signal component to generate first and second squared values; and
subtracting one of the first and second squared values from the other one of the first and second squared values to generate an amplitude error correction update value.

* * * * *